United States Patent
Bhattacharya et al.

(10) Patent No.: US 7,975,031 B2
(45) Date of Patent: Jul. 5, 2011

(54) CHANGE MANAGEMENT IN MULTI-DOMAIN ENVIRONMENTS

(75) Inventors: Kamal Bhattacharya, Hawthorne, NY (US); Jim A. Laredo, Hawthorne, NY (US); Heiko Ludwig, San Jose, CA (US); Liliana Pasquale, Milan (IT); Bruno Wasserman, London (GB)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 12/575,007

(22) Filed: Oct. 7, 2009

(65) Prior Publication Data
US 2011/0082920 A1   Apr. 7, 2011

(51) Int. Cl.
G06F 15/16 (2006.01)
G06F 15/173 (2006.01)
G06F 15/177 (2006.01)

(52) U.S. Cl. ......... 709/221; 717/121; 370/252; 713/100
(58) Field of Classification Search .......... 709/217–228; 717/121; 370/252; 713/100
See application file for complete search history.

(56) References Cited

U.S. PATENT DOCUMENTS

| | | | |
|---|---|---|---|
| 6,088,697 A | 7/2000 | Crockett et al. | |
| 6,272,536 B1 | 8/2001 | van Hoff et al. | |
| 6,321,204 B1 | 11/2001 | Kazami et al. | |
| 2007/0061191 A1 | 3/2007 | Mehrotra et al. | |
| 2008/0151899 A1* | 6/2008 | Li | 370/392 |
| 2008/0208792 A1* | 8/2008 | Aikens et al. | 707/1 |
| 2008/0209398 A1* | 8/2008 | Aikens et al. | 717/121 |
| 2008/0244071 A1* | 10/2008 | Parupudi et al. | 709/226 |
| 2009/0279444 A1* | 11/2009 | Ravindran et al. | 370/252 |
| 2009/0287936 A1* | 11/2009 | Ohkado | 713/183 |
| 2010/0005346 A1* | 1/2010 | Hamlescher et al. | 714/57 |
| 2010/0094729 A1* | 4/2010 | Gray et al. | 705/27 |
| 2011/0029767 A1* | 2/2011 | Ayachitula et al. | 713/100 |

OTHER PUBLICATIONS

Jeff Kramer, Jeff Magee, "The Evolving Philosophers Problem: Dynamic Change Management," IEEE Transactions on Software Engineering, vol. 16, No. 11, Nov. 1990, pp. 1293-1306.
Heikki Hämmäinen, Eero Eloranta and Esko Pohjanpalo: Semi-automated user agents in distributed change management, Journal of Intelligent Manufacturing, (1990) 1, 203-216, Dec. 31.
Yuh-Min Chen, Wei-Shin Shih, Chung-Yen Shen: Distributed Engineering Change Management for Allied Concurrent Engineering. Portland International Conference on Management of Engineering and Technology, 2001. PICMET '01, Dec. 31, 2001, p. 391.
Lech Krzanik, University of Oulu & CCC Software Professionals, Finland; Teemu Riipinen, Nokia Mobile Phones, Finland: Web-Distributed Change Evaluation and Management. In Proceedings of WebNet World Conference on the WWW and Internet 1999, Dec. 31, 1999, pp. 2.

* cited by examiner

*Primary Examiner* — Haresh N Patel
(74) *Attorney, Agent, or Firm* — Cantor Colburn LLP; Louis J. Percello

(57) ABSTRACT

Method, server, and computer product are provided to implement change management across domains. Memory is included for storing a program. A processor is functionally coupled to the memory and is responsive to computer-executable instructions contained in the program. The processor is operative to announce planned changes for a configuration item to interested outside domains, and the configuration item is in an inside domain. Open subscription is provided to the interested outside domains such that the interested outside domains can subscribe to the subscription as participants. A change instance is created or the configuration item in the inside domain. Change progress of the change instance is reported for the configuration item to the participants of the interested outside domains. State progress notifications are distributed to the participants of the change. The change instance is executed to make planned changes to the configuration item.

17 Claims, 7 Drawing Sheets

US 7,975,031 B2

CHANGE MANAGEMENT IN MULTI-DOMAIN ENVIRONMENTS

BACKGROUND

Exemplary embodiments relate to change management in multi-domain environments, and more specifically, to managing change across organizational boundaries.

Distributed systems increasingly span organizational boundaries, and with this, system and service management domains. Examples are Web service-based integration of electronic commerce solutions, the integration of Software-as-a-Service (SaaS) with customer managed applications and mashups, and the use of Cloud based resources on an infrastructure level or on a platform level. Maturing cross-domain relationships and an increase in loose coupling and ad-hocness make managing configuration changes, e.g., changes in interfaces or endpoints, increasingly relevant. Traditional service management processes, in particular change management, rely on a central configuration management database (CMDB) to assess the impact of a change to other components of the system. However, this approach does not work in a cross-domain environment without central CMDB, without centralized management processes, and often without understanding of the party providing a service and the clients who depend on it.

Also, in an environment of software as a service, cloud computing, Web 2.0 and the like, organizations are increasingly dependent on information technology (IT) and communication infrastructure they do not own and manage. There are often complex dependency relationships between services hosted by a service provider and internal systems such as an SaaS provider hosting a sales application while authorizing users with a lightweight directory access protocol (LDAP) system that its customer organization manages. In current IT practice, changes to a system infrastructure, which are inevitable, will be managed using a change management process. This process will assess the impact on all systems concerned in an organization, develop a change plan, schedule the change, test it and then roll it out. The crucial impact assessment is typically based on a central configuration management database (CMDB) from which dependencies can be derived. However, in an environment in which services of different service providers and their customers are meshed together, this traditional change management approach cannot consider impact on infrastructure outside one organization's management domain since it is not represented in a CMDB. A cloud provider does not know what runs on its hypervisors, and hence, which business processes will be affected in the operations of its clients. Hence, the affected systems in other organizations are not known. Furthermore, separate organizations run different change processes and change management systems.

BRIEF SUMMARY

According to one exemplary embodiment, a server is configured to implement change management across domains. Memory is included for storing a program. A processor is functionally coupled to the memory and is responsive to computer-executable instructions contained in the program. The processor is operative to announce planned changes for a configuration item to interested outside domains, and the configuration item is in an inside domain. Open subscription is provided to the interested outside domains such that the interested outside domains can subscribe to the subscription as participants. A change instance is created for the configuration item in the inside domain. Change progress of the change instance is reported for the configuration item to the participants of the interested outside domains. State progress notifications are distributed to the participants of the change. The change instance is executed to make planned changes to the configuration item.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features of the present disclosure are apparent from the following detailed description taken in conjunction with the accompanying drawings in which:

DETAILED DESCRIPTION

Mechanisms of exemplary embodiments enable management of change across organizational boundaries. Mechanisms may be based on managing dependencies across domain boundaries without centralized CMDB and integrating the change management processes of external parties in a lightweight manner.

In accordance with exemplary embodiments, the distribution of management responsibility for cross-domain applications is a decentralized approach to change management that can address (1) how to assess the impact of a change if the configuration items subject to change are being used by other management domains, and (2) how to involve other organizations in a change process.

Figure 1:
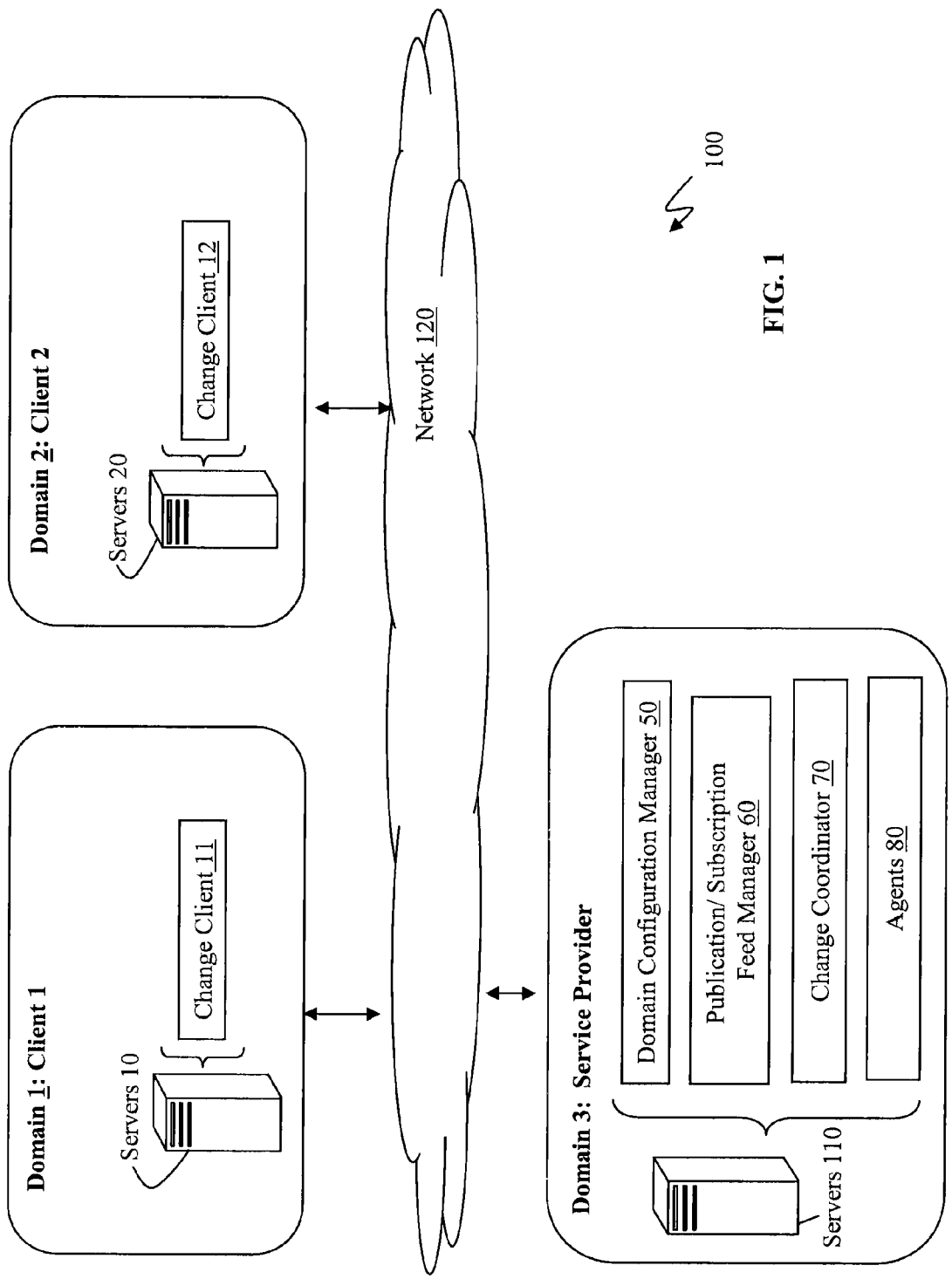
FIG. 1 illustrates a block diagram in accordance with exemplary embodiments.

Now turning to FIG. 1, FIG. 1 illustrates a block diagram 100 in accordance with exemplary embodiments. In FIG. 1, there are only three domains illustrated for conciseness but it is understood by one skilled in the art that numerous domains may be represented in the block diagram 100. The rounded boxes represent different management domains, and FIG. 1 illustrates domain 1, domain 2, and domain 3.

In FIG. 1, domain 3 represents a service provider who provides various services and assets to domain 1 which is client 1, to domain 2 which is client 2, and to other domains (not shown). In the block diagram 100, each domain may include various assets such as computing devices, storage devices, network devices, etc., and the various types assets of domains are understood by one skilled in the art. For explanation purposes, the various assets are represented as servers. For example, each domain is shown as having various servers, e.g., domain 1 includes servers 10, domain 2 includes servers 20, domain 3 includes servers 110, and each domain may include additional assets as known in the art. The domains 1, 2, and 3 may communicate with one another over a network 120. For clarity, the network 120 is not illustrated in FIGS. 2-5, but is understood.

Exemplary embodiments provide change management across domain boundaries of domains 1, 2, and 3. Exemplary embodiments may be based on an inversion of responsibility for dealing with change impact. For example, the service provider of domain 3 publishes planned changes to its public configuration items (shown in FIGS. 2-4), to which service consumers in domains 2 and 3 can subscribe and then join a change coordination protocol, which integrates the change processes of the management domains 2 and 3 involved.

In a single management domain, such as a single company, service management today is mostly conducted along the lines of various sources of best practices, e.g., the IT Infrastructure Library (ITIL) and the Control Objectives for Information and related Technologies (COBIT). Assets and configuration items (CIs) (such as the CIs shown in FIGS. 2-5) are the information on which service management processes are based. Assets represent the business and accounting view on hardware components such as servers and networking components as well as any licenses. CIs represent entities that can be configured and their properties. For examples, CIs may include hard disks, application servers, web application archive (WAR) or Enterprise ARchive (EAR)-type web applications and the like. Properties of interest may be IP addresses of virtual machines, web service endpoint URLs, WSDLs associated with an endpoint, etc. What kinds of CIs and their properties depend on the intended use of the CI and the CMDB. The Distributed Management Task Force (DMTF) publishes a Common Information Model that proposes a standard set of CI types to which many vendors adhere. An important aspect of CIs in a CMDB is the notion of dependency of one CI on another CI. ITIL identifies a number of service processes such as incident management (tickets), problem management, change management, release management, SLA management, asset management and more. Service processes can trigger each other, e.g., a problem process can trigger a change process if fixing the problem requires a configuration change. Asset and configuration information are updated regularly in a discovery process that identifies new assets and CIs and changes in its configuration by searching for and analyzing systems on the network of a service infrastructure. CI and asset changes can also be driven by service management processes.

In a single management domain, it is assumed that all assets and CIs relevant for the service management processes can be found in the asset database (DB) and CMDB; it is assumed that these CIs can be discovered and read by accessing the service infrastructure and used in the change process, in particular the change design and the impact assessment. While this assumption may hold for change management internal to a single domain, for the widely distributed application environments, exemplary embodiments are designed to cater to more demanding issues. For example, there are applications needing change management which are comprised of software and infrastructure services from various administrative domains across the Internet. This leads to a distributed application infrastructure in which different elements of this infrastructure are owned and managed by different organizations. Such dependencies (e.g., by domains 1 and 2) on infrastructure outside of a single organization's domain (e.g., dependent on domain 3) has implications for change management. The distribution of management responsibility of web-based applications requires a decentralized approach as provided in exemplary embodiments to service management that takes into account the distribution of management information and the execution of management processes across organizational boundaries.

For clarity and ease of understanding, many examples are discussed herein for a change that may refer to a particular configuration item in a particular domain. It is understood that a change is not limited to a single configuration item in a single domain but may apply to multiple configuration items (e.g., one or more configuration items) in multiple domains. In exemplary embodiments, a change actually lists all (numerous) configuration items that are affected by the change even though for explanation purposes, only one or two configuration items may be referred to at times.

Figure 2:
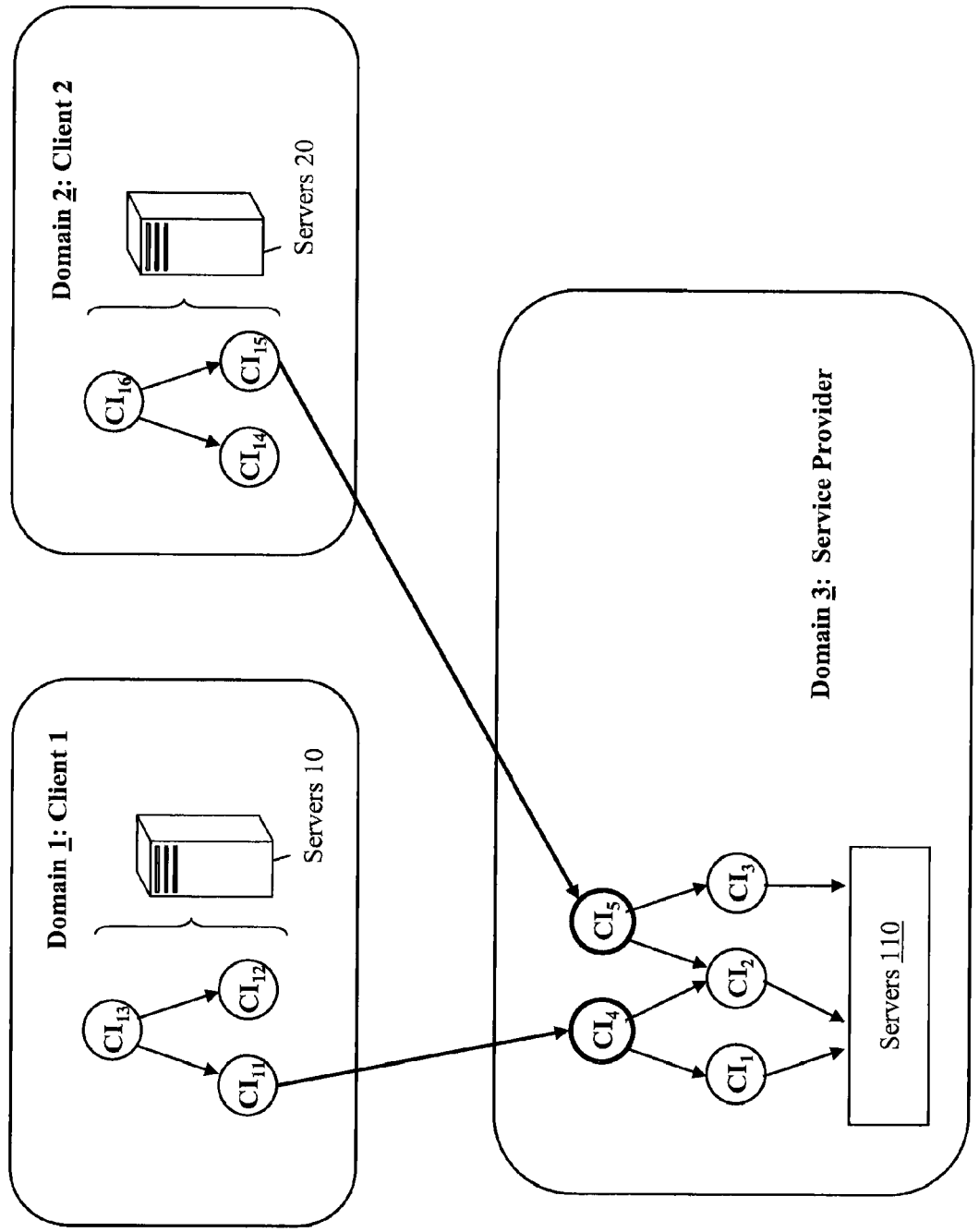
FIG. 2 illustrates a block diagram in accordance with exemplary embodiments.

FIGS. 2-5 provide more details as an example of a widely distributed and loosely coupled application. Turning to FIG. 2, FIG. 2 depicts the block diagram 100 illustrating the different management domains 1, 2, and 3 and depicts circles which are the CIs (as discussed herein) that exist in these domains. The bold circles represent CIs on which other external management domains depend for the services they offer to their clients, such as clients 1 and 2 in domains 1 and 2 respectively. The arrows pointing from a first CI to second CI represent a dependency on the second CI. For example, configuration item $CI_{11}$ in domain 1 is dependent on $CI_4$ in domain 3. Configuration item $CI_{15}$ in domain 2 is dependent on $CI_5$ in domain 3.

Although domains 1 and 2 are illustrated as having assets such as the servers 10 and 20, it is understood that the domains 1 and 2 (and/or any other domains) may be a lean startup that does not have assets of its own, but instead realizes its service offering by relying on a number of services from other management domains, such as the domain 3. The domains 1 and 2 may depend on a cloud service for executing some intensive computations. For example, the relevant properties of the compute service provider (such as the domain 3) are things such as the type and version of hypervisor, the end point where to access the service, and/or the interface detailing operation signatures. For example, the domains 1 and 2 may utilize a credit card processing service provided by an enterprise (such as domain 3) and/or may utilize a service of a storage service provider (e.g., domain 3). The relevant properties for these dependencies may include the operation signatures, service version, storage size limit, authentication mechanism, endpoint addresses, schema changes, and so on.

At some point, the service provider of domain 3 may need to modify some of the CIs under its control, such as $CI_4$ and $CI_5$. This can potentially negatively impact their users such as clients 1 and 2. For example, as a compute service provider, the domain 3 may decide to adopt another type of hypervisor that may only support a subset of the previously supported guest operating systems of domain 1 and domain 2. This change may potentially disrupt the service of a web startup which may be domain 1 and/or 2. Similarly, a change in the signature of operations accessing the web service of the storage service provider of domain 3 may disrupt the credit process and thereby via a chain of dependencies of other domains such as domains 1 and 2. As such, the effect on the startup may be its inability to process payments made by its clients.

If the service provider of domain 3 were to conduct these changes independently of its clients 1 and 2 in domains 1 and 2 respectively, the clients' services may be disrupted when the new release goes into effect. For cross-domain dependencies, exemplary embodiments do not require a CMDB and remove the burden of identifying which clients 1 and 2 to contact by the server provider of domain 3.

For example, a domain configuration manger 50, a publication/subscription feed manager 60, and a change coordinator 70 are operative to revert the responsibilities to the clients in domains 1 and 2. Although for explanation purposes the domain configuration manger 50, the publication/subscription feed manager 60, the change coordinator 70, and/or agents 80 may be illustrated as separate software modules implemented by the servers 110 in FIGS. 1, 3, 4, and 5, it is understood that software modules may be integrated into a single software module and/or software program in accordance with exemplary embodiments.

The domain configuration manger 50, the publication/subscription feed manager 60, and the change coordinator 70 provide the discovery of configuration information and notifications about changes to the configuration items $CI_4$ and $CI_5$ for the domain 3. In the absence of a centralized CMDB and given that service providers such as domain 3 cannot take over this role, each client 1 and 2 is responsible for discovering and maintaining all those CIs (e.g., $CI_4$ and $CI_5$) it depends on in accordance with exemplary embodiments.

Figure 3:
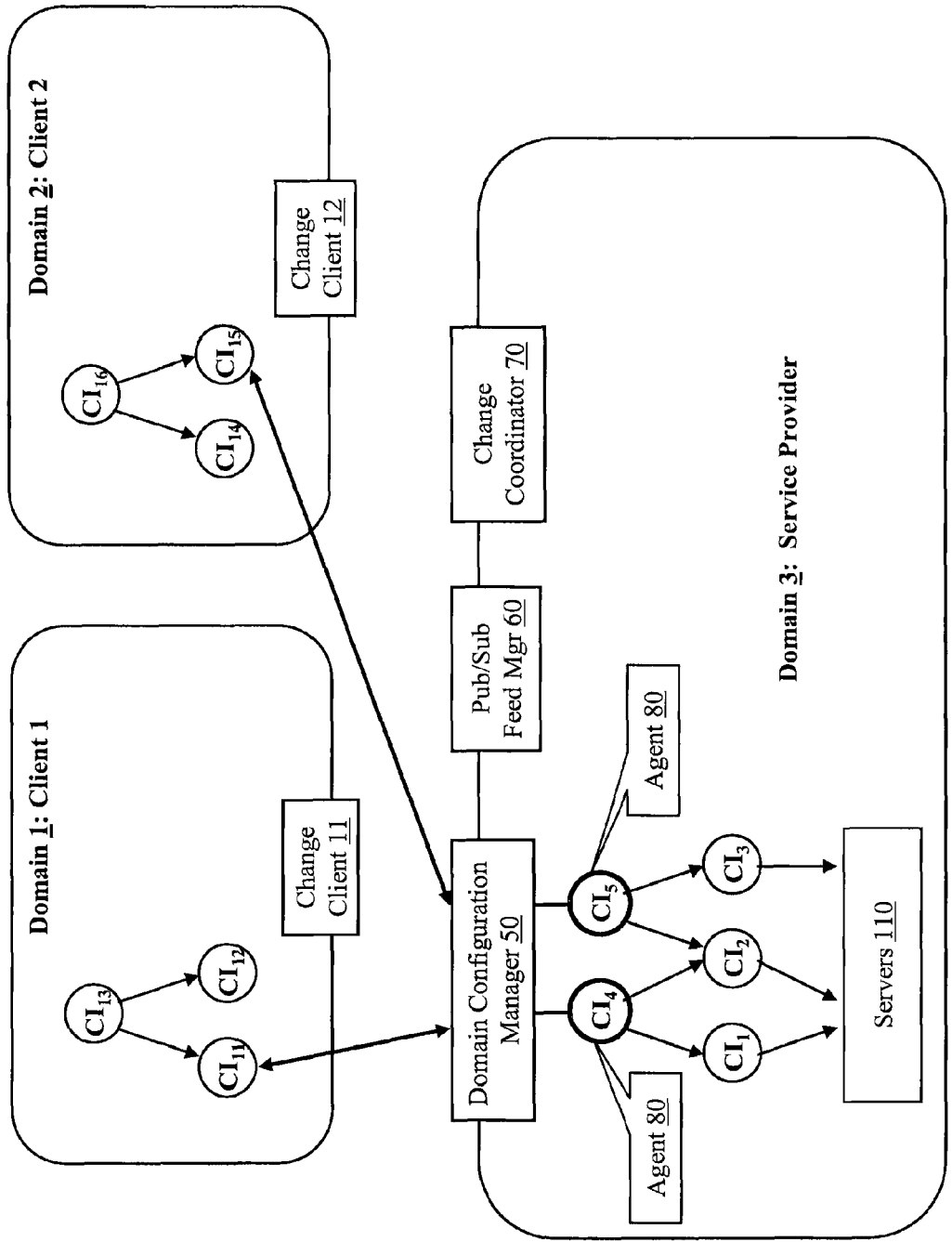
FIG. 3 illustrates a block diagram in accordance with exemplary embodiments.

With reference to FIG. 3, the domain configuration manager 50 provides a decentralized configuration discovery mechanism for the domains 1 and 2, in which each resource such as $CI_4$ and/or $CI_5$ carries out a local discovery, e.g., via its respective agent 80. The domain 1 may include a change client 11, and the domain 2 may include a change client 12. The change clients 11 and change client 12 are operative to work with the domain configuration manager 50, the publication/subscription fee manager 60, and/or the change coordinator 70. The change clients 11 and 12 may be, e.g., downloaded from a web site of the service provider of domain 3.

Figure 4:
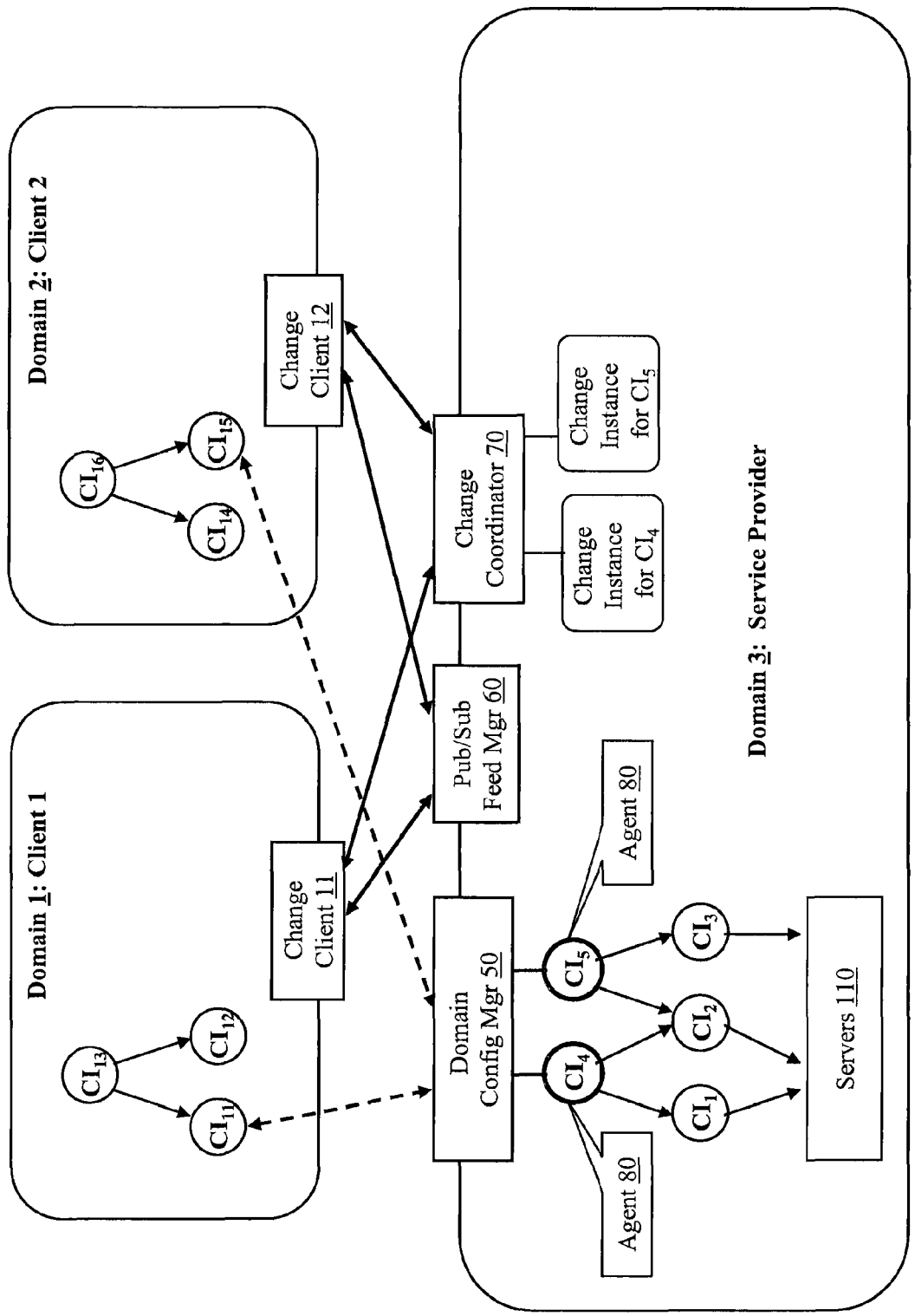
FIG. 4 illustrates a block diagram in accordance with exemplary embodiments.

Furthermore, since the domain configuration manager 50 may provide knowledge of the configuration items $CI_4$ and $CI_5$ on which the clients in domains 1 and 2 depend, the clients in domains 1 and 2 are able to subscribe to changes on the particular CIs relevant to their operation as shown in FIG. 4. In response to receiving the discovery of configuration items $CI_4$ and $CI_5$ from the domain configuration manager, client 1 in domain 1 may subscribe to receive notification about planned changes for $CI_4$, and client 2 in domain 2 may subscribe to receive notification about planned changes for $CI_5$. For example, the client 1 in domain 1 may subscribe to the publish/subscription feed manager 60 for changes about $CI_4$ via the change client 11 of the servers 10. The client 2 in domain 2 may subscribe to the publish/subscription feed manager 60 for changes related to $CI_5$ via the change client 12 of the servers 10. In FIG. 4, the change coordinator 70 is operative to receive a request for a subscription to the planned changes for $CI_4$ and $CI_5$. The publish/subscription feed manager 60 of the service provider in domain 3 is then responsible to publish notifications to the domains 1 and 2 about planned changes to the CIs such as the $CI_4$ and $CI_5$ under the control of service provider of domain 3. These notifications are configured to describe changes in sufficient detail for subscribers in domains 1 and 2 to carry out an impact analysis.

The publish/subscription feed manager 60, which is the delivery mechanism for notifications, is operative to scale to a large number of subscribers such as clients 1 and 2 in domains 1 and 2 respectively, along with other clients, and work across the Internet, e.g., the network 120. Exemplary embodiments reduce the complexity of cross domain issues, as each client 1 and 2 maintains its own set of dependencies and the service provider in domain 3 can remain unaware of the clients 1 and 2 for the purpose of change management.

Instead, of a global change process, a decentralized coordination protocol is implemented by the change coordinator 70. The coordination protocols of the change coordinator 70 are applied in situations where a dynamic number of participants are being coordinated, e.g., for the client 1 in domain 1, client 2 in domain 2, and other clients in various domains. Coordination in this case refers to the distribution of state updates to the participants (such as clients 1 and 2) involved and advancing the state of the coordination according to a state model, such as an example state model 500 illustrated in FIG. 5. In accordance with exemplary embodiments, planned changes for $CI_4$ would have its own state model 500, while planned changes for $CI_5$ would have its own different state model 500.

In exemplary embodiments, this coordination by the change coordinator 70 may be based on a state model representing the least common denominator of states a distributed change processes assumes, corresponding to the phases or steps of a change process. Participants such as client 1 in domain 1 and client 2 in domain 2 are free to implement the various phases of the change process as required at their end for their respective configuration items $CI_{11}$ and $CI_{15}$.

Figure 5:
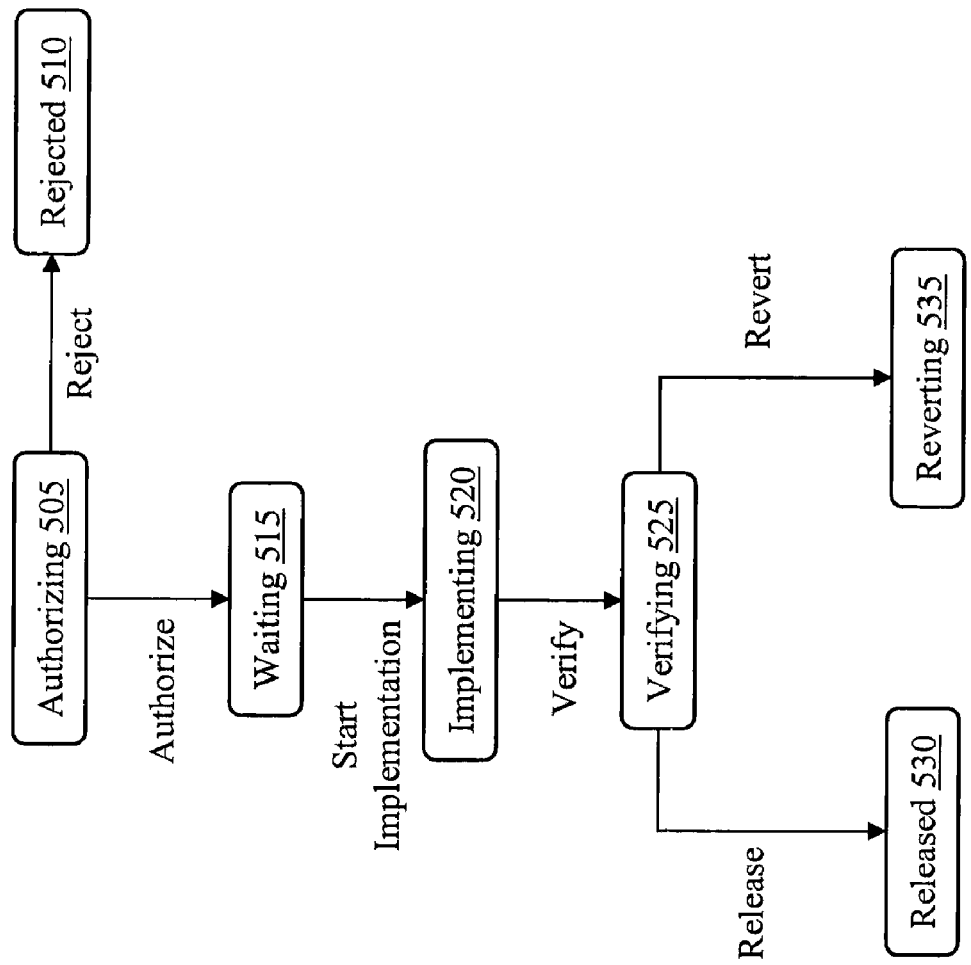
FIG. 5 illustrates an example state model in accordance with exemplary embodiments.

With reference to FIG. 5, FIG. 5 illustrates an example of a shared state model 500 in accordance with exemplary embodiments. In exemplary embodiments, there is a shared state model 500 that corresponds to planned changes for the $CI_4$, and there is a separate (distinct) state model 500 that corresponds to planned changes for the $CI_5$. It is understood that there may be numerous individual state models 500 that correspond to any particular configuration item undergoing a planned changed.

The publish/subscription feed manager 60 is operative to publish the particular shared state model 500 (that corresponds to planned changes for $CI_4$) to the change client 11 of the client 1 for domain 1. Likewise, the publish/subscription feed manager 60 is operative to publish the particular shared state model 500 (that corresponds to planned changes for $CI_5$) to the client change 12 of the client 2 for domain 2.

In FIG. 5, the initial state is authorization 505 during which participants (such as clients 1 and 2) join the coordination process and have an opportunity to vote whether or not to go ahead with the planned change provided to the participants. For example, the change coordinator 70 may invite client 1 (e.g., a large client such as America Express™) to participate in the coordination process. There may be numerous other clients in their respective domains that are also receiving the state model 500, but some of these other clients (e.g., smaller clients) may not be authorized by the change coordinator 70 to vote whether to proceed or not to proceed with the planned changes to, e.g., $CI_4$ and $CI_5$, while certain clients (e.g., larger clients) are authorized to vote whether or not to proceed.

If a participant such as client 1 and 2 votes to reject the change, the state of the change process will reflect this rejection 510 and all the other participants (e.g., client X in domain X, client Y in domain Y, client Z in domain Z, and so forth) whether voting or not are notified of the decision. The change coordinator 70 is operative to receive the votes, store the votes for example in memory of the servers 110, and provide votes of each client to all of the clients via their respective change client, such as the change clients 11 and 12.

The service provider of domain 3 may wait 515 to receive all votes at the change coordinator 70 and feedback from the participants.

The change coordinator 70 of the service provider in domain 3 may take into account any votes to reject by the clients in other domains (such as clients 1 and 2), and/or if no one rejects the change by the planned start time of the change, the change coordinator 70 of the service provider in domain 3 (change owner which owns the configuration items undergoing the change such as $CI_4$ and/or $CI_5$) is free to indicate when it has started the implementation 520 and the common state model 500 will reflect the start, which in turns prompts all participants (such as clients 1 and 2 and other clients) to carry out the necessary changes at their end (e.g., in their respective domains). For example, the change coordinator 70 may release a test version and/or inform the participants that a text version will be released of the planned changes to the configuration items (e.g., $CI_4$ and/or $CI_5$), such that the participants may adjust accordingly.

Once change coordinator 70 of the service provider in domain 3 has completed its implementation of the change in the test version and all participants have adapted accordingly, the common state model transitions to the verification phase 525 by the change coordinator 70. During the verification phase 525, the change coordinator invites clients in other domains, such as clients 1 and 2, to test the changes in the test version of the respective configuration items as the service provider itself in domain 3 tests the test version.

After testing, the change coordinator 70 can release 530 the changes for everyone (not just the participants) to see and utilize.

The service provider in domain 3 may decide to undo (some or all) the changes and revert 535 back to the previous version of the configuration items ($CI_4$ or $CI_5$).

The examples of the states illustrated in FIG. 5 may loosely follow the ITIL service management process and may represent the common states necessary to allow participants (client 1 and 2, and others) to synchronize on implementation and testing of changes. The change coordinator 70 is operative to provide updates to (and receive responses from) the clients 1 and 2 for each step in the state process 500 in accordance with exemplary embodiments. Please note that participants represent clients in various domains who are dependent upon the resources (configuration items) of, e.g., the service provider in domain 3.

As discussed above with respect to the state model 500, exemplary embodiments provide various modes of collaboration about the planned changes and more detail is provided below. Given the cross-domain and even cross-organizational nature of change processes, it is important to ensure that service providers can maintain control over their configuration items (resources) and still cooperate with those clients 1 and 2 affected by the changes of configuration items in domain 3. Accordingly, exemplary embodiments describe collaboration modes of the change coordinator 70. These collaboration modes represent different levels of influence that various participants may be granted by the change coordinator 70 of domain 3 over the outcome of the change process for particular configuration items, such as $CI_4$ and $CI_5$. The change coordinator 70 is operative to provide the following example collaboration modes for the clients 1 and 2, along with other clients in various domains.

1) Informative participants: The change coordinator 70 is operative to notify informative participants of progress made as the change process runs (i.e., authorizing 505 and/or implementing 520), but the change coordinator 70 does not allow the informative participants to have any influence over the change process, and the informative participants do not supply any feedback. An informative participant is enabled to follow the change process continuously provided by the change coordinator 70 and adapt to the states of the change process, but no further cooperation can take place by the informative participant.

2) Consultative participants: In addition to the privileges of the informative participants, the change coordinator 70 is operative to ask a consultative participant to provide feedback about the change process, such as whether the consultative participant could verify the change, how long it took to implement the necessary changes at the consultative participant's end, and/or whether the change to the configuration item is a good idea. This affords collection of information about how clients adapted to a change, and it may be useful to aggregate such information over time by the change coordinator 70.

3) Co-Authorizing participants: In addition to the privileges of the informative and consultative participants above, in this case, the change coordinator 70 is operative to provide a co-authorizing participant the ability to influence the change process through its authorization vote. A co-authorizing participant can vote to reject (or accept) the change during the authorization phase 505.

4) Co-Verifying participants: In addition to the privileges of the informative, consultative, and co-authorizing participants above, the change coordinator 70 is operative to allow the co-verifying participant's vote during the verification phase 525 to be taken into account by the change coordinator 70. A co-verifying participant whose adaptation to a change failed can thus cause the service provider in domain 3 and all other participants to revert 535 their changes.

The following is an example in accordance with exemplary embodiments. The domain configuration manager 50, publish/subscription feed manager 60, and change coordinator 70 are operative to carry out change notifications in a scalable manner, to allow clients such as clients 1 and 2 to easily integrate with the change coordination protocol, and to respect the autonomy of the various domains involved in the change.

In response to the service provider of domain 3 submitting a new planned change for the configuration items $CI_4$ and $CI_5$ to change coordinator 70, the change coordinator 70 is operative create a new change instance, such as the change instances for $CI_4$ and $CI_5$, respectively. The change instance for $CI_4$ may be linked to a URL for this change instance $CI_4$, and likewise for $CI_5$. Furthermore, this URL for the corresponding change instance may be transmitted from the change coordinator 70 to the change clients 11 and 12.

The domain configuration manager 50 is operative to provide the discovery of configuration items that are about to undergo changes, such as configuration items $CI_4$ and $CI_5$. Instead of relying on a centralized approach and CMDBs, each resource performs discovery of its CIs through its own locally installed agent 80. This information may, e.g., be made available to clients 1 and 2 respectively in an XML format, referred to herein as Smart Configuration Items (SCI). Each SCI contains the properties of the configuration item (e.g., $CI_4$ and $CI_5$) it represents and a set of dependencies on other SCIs. As such, an SCI for $CI_4$ contains any hardware and/or software related to $CI_4$, along with the other CIs that $CI_4$ is dependent upon, such as $CI_1$ and $CI_2$. Likewise, an SCI for $CI_5$ contains any hardware and/or software related to $CI_5$, along with the other CIs that $CI_5$ is dependent upon, such as $CI_3$ and $CI_2$. The dependencies of $CI_4$ and $CI_5$ can either be in the same domain (e.g., domain 3) and/or in some remote domain. The domain configuration manger 50 is operative to maintain a registry of all SCIs that are discovered in its domain 3 and expose the SCIs to interested clients 1 and 2 in domains 1 and 2 respectively. The domain configuration manger 50 may utilize, e.g., a RESTful interface to expose the properties of configuration items $CI_4$ and $CI_5$. to configuration items $CI_{11}$ (change client 11) and $CI_{15}$ (change client 12), respectively. Each resource, such as $CI_4$ and $CI_5$, may thus be responsible to maintain its own set of dependencies.

The publish/subscription feed manager 60 (and/or change coordinator 70) is operative to provide subscription to and receive subscriptions from client 1 for $CI_4$ and client 2 for $CI_5$. The publish/subscription feed manager 60 is to operative provide notifications of planned changes to $CI_4$ and $CI_5$ respectively for client 1 and client 2. The client 1 in domain 1 and the client 1 in domain 2 may download their respective change clients 11 and 12, subscribe to receive (from the domain configuration manger 50, the publish/subscription feed manager 60, and/or the change coordinator 70) their respective change clients 11 and 12, and/or interface with the change client 11 and change client 12, respectively.

The change clients 11 and 12 may, e.g., be a web-based user interface that allows end users representing a service provider (such as the server provider in domain 3) to supply information to their clients about planned changes for $CI_4$ and $CI_5$. Through this user interface of clients 11 and 12, clients 1 and 2 can (first) retrieve from the domain configuration manager 50 a list of SCIs (e.g., all SCIs that belong to their respective application and/or all SCIs that represent databases under control of domain 3) for $CI_4$ and $CI_5$. Next, the publish/subscription feed manager 60 and/or the change coordinator 70 is operative to provide (to the change clients 11 and 12) the planned changes to the selected SCIs and supply information such as the planned start time and a natural-language description of the changes to be made for each configuration item $CI_4$ and $CI_5$. For example, the publish/subscription feed manager 60 and/or the change coordinator 70 is operative to provide the change properties to the configuration items $CI_4$ and $CI_5$ and their respective state model 500.

The domain configuration manger 50 is operative to be a central domain service for domain 3 and is operative to act as the entry point to change management functionality involving domain 3. The domain configuration manger 50 is operative to add the newly submitted change notifications to the publish/subscription feed manager 60 (such as, e.g., a set of RSS feeds). The publish/subscription feed manager 60 is operative to describe the latest changes to SCIs for $CI_4$ and $CI_5$ in its domain and to provide these change notifications to the change clients 11 and 12. The change clients 11 and 12 may comprise a subscription client. Via the user interface of the change clients 11 and 12, the clients 1 and 2 can view the SCIs on which they respectively depend upon in response to the clients 1 and 2 requesting the change clients 11 and 12 to subscribe to the planned change feeds of its dependencies. Knowledge of these dependencies results from the local discovery of resources ($CI_4$ and $CI_5$) by the agent 80. The change clients 11 and 12 are operative to poll the domain configuration manager 50 for relevant change instances for $CI_4$ and change instances for $CI_5$ for new changes to these dependencies, and the change clients 11 and 12 displays them. The domain configuration manger 50 is operative to also notify the clients 1 and 2 via email and short message service (SMS). The clients 1 and 2 can view the details of any new changes and carry out an impact analysis in their own respective domains 1 and 2.

As discussed herein, the change coordinator 70 is operative to provide various levels of collaboration modes to the clients 1 and 2, such as informative, consultative, co-authoring, and/or co-verifying. Should it be necessary to adapt to this change in a coordinated manner, the change coordinator 70 is operative to receive votes and/or feedback from the change clients 11 and 12. The change coordinator 70 is configured to allow the change clients 11 and 12 to register, submit votes, and inquire about the current status of an ongoing change process.

The change coordinator 70 may include features of a REST interface. The change coordinator 70 is operative to include a state machine implementing the common state model 500. The change coordinator 70 is operative to inspect all incoming requests and determine whether or not to transition to the next state in the state model 500. For example, change coordinator 70 may be free to transition to verifying 525, once the service provider in domain 3 and all clients (such as clients 1 and 2) indicate that they have completed the implementation and/or adaptation to the change of the respective configuration items ($CI_4$ and $CI_5$). Upon a state transition by the change coordinator 70, the change coordinator 70 is operative to provide the status update for the configuration item to the change clients 11 and 12 (e.g., http://cp.acme.com/status/update) to update clients 1 and 2 of the transition. The change coordinator 70 may then await reaction of the clients 1 and 2.

For example, the change coordinator 70 may inform everyone that the verifying phase 525 has been reached and indicate that it now awaits votes from the service provider in domain 3 and participants (clients 1 and 2) indicating whether or not they verify the change. As mentioned herein, all participants do not have the voting privileges throughout the change process. Similarly, once the change coordinator 70 informs everyone that the change coordinator 70 is about to release the change, the change coordinator 70 waits for confirmation that the clients in domain 1 and 2 have made their respective changes in order for the change process to enter the final change released state 530.

As understood by one skilled in the art, representational state transfer (REST) is a style of software architecture for distributed hypermedia systems such as the World Wide Web. A specific REST-style architecture such as the web consists of clients and servers.

Further regarding the network 120, the network 120 may include circuit-switched and/or packet-switched technologies and devices, such as routers, switches, hubs, gateways, etc., for facilitating communications. The network 120 may include wireline and/or wireless components utilizing, e.g., IEEE 802.11 standards for providing over-the-air transmissions of communications. The network 120 can include IP-based networks for communication between a customer service center and clients/users. Also, the network 120 may include wireline and/or wireless components utilizing standards, e.g., multimedia messaging services (MMS) and short messaging services (SMS). The network 120 can include a managed IP and/or wireless network administered by a service provider, which can control bandwidth and quality of service for the communications discussed herein. The network 120 may be implemented in a wireless fashion, e.g., using wireless protocols and technologies, such as such as Wi-Fi®, WiMAX™, Bluetooth®, etc. The network 120 can also be a packet-switched network, such as a local area network, a wide area network, a metropolitan area network, an Internet network, or other similar types of networks. The network 120 may be a cellular communications network, a fixed wireless network, a wireless local area network (LAN), a wireless wide area network (WAN), a personal area network (PAN), a virtual private network (VPN), an intranet or any other suitable network, and the network 120 may include equipment for receiving and transmitting signals, such as a cell tower, a mobile switching center, a base station, and a wireless access point.

Exemplary embodiments are not limited to but are capable of being implemented in the diagrams illustrated in FIGS.

1-7. Additionally, the servers 10, 20, and 110 may be representative of numerous servers. Also, the configuration items may be representative of numerous the configuration items (resources). Therefore, the diagrams illustrated in FIGS. 1-5 are neither limited numerically to the elements depicted therein nor limited to the exact configuration and operative connections of elements. Further, it is understood by those skilled in the art that elements may be added to, subtracted from, or substituted for the elements described in the diagrams. Also, elements such as the servers 10, 20, and 110 and other elements may be implemented in processor-based computer systems as discussed in FIG. 6 and may be programmed to operate and function in accordance with exemplary embodiments.

Figure 6:
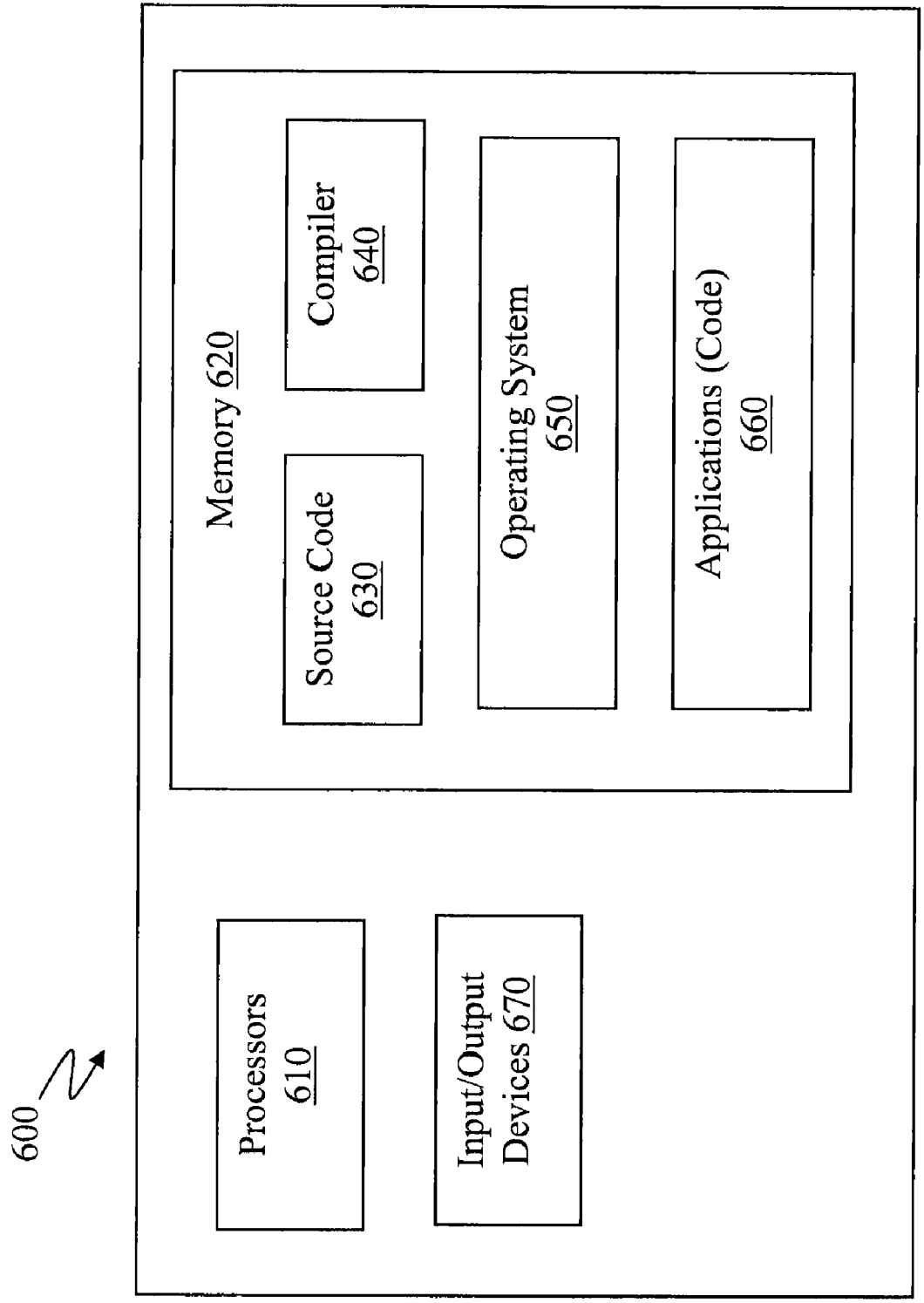
FIG. 6 illustrates an example of a computer having capabilities which may be included in exemplary embodiments.

FIG. 6 illustrates an example of a computer 600 having capabilities, which may be included in exemplary embodiments. Various methods, procedures, modules, flow diagrams, agents, and techniques discussed herein may also incorporate and/or utilize the capabilities of the computer 600. One or more of the capabilities of the computer 600 may be implemented in any element discussed herein, such as the change clients 11 and 12, the domain configuration manger 50, the publish/subscription feed manager 60, the change coordinator 70, the agents 80, the configuration items, and the domains 1, 2, and 3.

Generally, in terms of hardware architecture, the computer 600 may include one or more processors 610, computer readable memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The computer readable storage memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the computer readable storage memory 620 may include one or more separate programs, each of which comprises an ordered listing of executable instructions for implementing logical functions. The software in the memory 620 includes a suitable operating system (O/S) 650, compiler 640, source code 630, and one or more applications 660 of the exemplary embodiments. As illustrated, the application 660 comprises numerous functional components for implementing the features, processes, methods, functions, and operations of the exemplary embodiments. The application 660 of the computer 600 may represent numerous applications, agents, software components, modules, interfaces, etc., as discussed herein but the application 660 is not meant to be a limitation.

The operating system 650 may control the execution of other computer programs, and provides scheduling, input-output control, file and data management, memory management, and communication control and related services.

The application(s) 660 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions.

The I/O devices 670 may include input devices (or peripherals) such as, for example but not limited to, a mouse, keyboard, scanner, microphone, camera, etc. Furthermore, the I/O devices 670 may also include output devices (or peripherals), for example but not limited to, a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or an intranet. The I/O devices 670 may be connected to and/or communicate with the processor 610 utilizing Bluetooth connections and cables (via, e.g., Universal Serial Bus (USB) ports, serial ports, parallel ports, firewire, HDMI (High-Definition Multimedia Interface), etc.).

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable storage medium 620 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any statutory means that can store, read, write, communicate, or transport the program for use by or in connection with the instruction execution system, apparatus, or device. The computer readable storage medium can be, for example but not limited to, an electronic, magnetic, optical, or semiconductor system, apparatus, or device.

More specific examples (a nonexhaustive list) of the computer-readable storage medium 620 would include the following: a portable computer diskette (magnetic or optical), a random access memory (RAM) (electronic), a read-only memory (ROM) (electronic), an erasable programmable read-only memory (EPROM, EEPROM, or Flash memory) (electronic), and a portable compact disc memory (CDROM, CD R/W) (optical).

In exemplary embodiments, where the application 660 is implemented in hardware, the application 360 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 600 includes non-limiting examples of software and hardware components that may be included in various devices, servers, and systems discussed herein, and it is understood that additional software and hardware components may be included in the various devices and systems discussed in exemplary embodiments.

Figure 7:
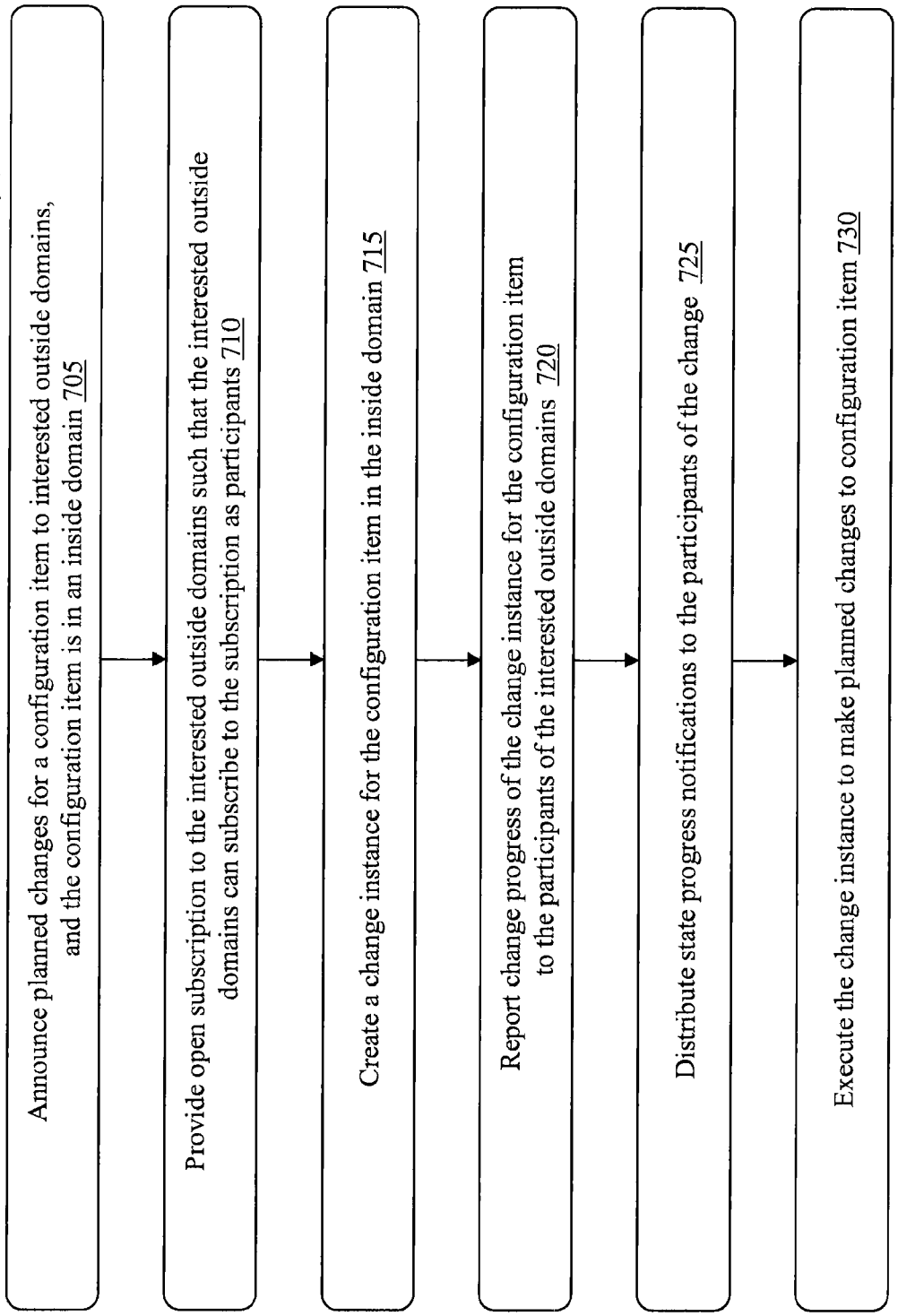
FIG. 7 illustrates a flow chart in accordance with exemplary embodiments.

FIG. 7 illustrates a flow chart 700 in accordance with exemplary embodiments. The flow chart 700 may be stored on the computer readable storage medium 620, e.g., as a computer program product. As discussed herein, although the domain configuration manager 50, publish/subscription feed manger 60, change coordinator 70, and agents 80 can be represented as separate software modules, they may be implemented as a single software module (on one or more servers 110) that includes the various features of one another in exemplary embodiments.

The server 110 is operative to announce planned changes for a configuration item to interested outside domains (such as domains 1 and 2), and the configuration item is in an inside domain (such as domain 3) at 705.

The server 110 is operative to provide open subscription to the interested outside domains such that the interested outside domains can subscribe to the subscription as participants at 710.

The server 110 is operative to create a change instance for the configuration item in the inside domain at 715.

The server 110 is operative to report change progress of the change instance for the configuration item to the participants of the interested outside domains at 720.

The server 110 is operative to distribute state progress notifications to the participants of the change at 725.

The server 110 is operative to execute the change instance to make planned changes to configuration item at 730.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A server configured to implement change management across domains, comprising:
   memory for storing a program; and
   a processor, functionally coupled to the memory, the processor being responsive to computer-executable instructions contained in the program and configured to:
   announce planned changes for one or more configuration items to interested outside domains, the configuration items being in an inside domain;
   provide open subscription to the interested outside domains such that the interested outside domains can subscribe as participants to notifications on changes referring to corresponding configuration items of interest;
   create a change instance for the configuration items in the inside domain;
   report change progress of the change instance for the configuration items to the participants of the interested outside domains;
   distribute state progress notifications to the participants of the change;
   execute the change instance to make planned changes to configuration items;
   cause a computer in the interested outside domains to receive notifications of the planned changes for the configuration items; and
   enable the computer to join a subscription in a change coordination for the configuration items.

2. The server of claim 1, wherein the processor is operative to maintain a table of externalized configuration items that can be accessed by the interested outside domains.

3. The server of claim 1, wherein the processor is operative to classify the participants of the interested outside domains for the planned changes as informative participants; and
    wherein the informative participants are enabled to follow a change process of the planned changes without influencing the panned changes.

4. The server of claim 1, wherein the processor is operative to classify the participants of the interested outside domains for the planned changes as consultative participants; and
    wherein the consultative participants are enabled to provide feedback about a change process.

5. The server of claim 4, wherein in response to the feedback from the consultative participants, the processor is operative to receive verification of the planned changes, an amount of time that was required to implement necessary changes by the consultative participants, and whether the planned change to the configuration item is an acceptable proposal.

6. The server of claim 4, wherein in response to the feedback from the consultative participants, the processor is operative to aggregate data of the feedback over time.

7. The server of claim 1, wherein the processor is operative to classify the participants of the interested outside domains for the planned changes as co-authorizing participants; and
    wherein the processor is operative to enable the co-authorizing participants to influence a change process through the co-authorizing participants' authorization vote.

8. The server of claim 7, wherein the processor is operative to allow the authorization vote of the co-authorizing participants to vote to reject the planned changes or accept the planned changes during an authorization phase.

9. The server of claim 1, wherein the processor is operative to classify the participants of the interested outside domains for the planned changes as co-verifying participants; and
    wherein the processor is operative to enable co-verifying participants to influence a change process through the co-authorizing participants' verification vote during verification phase.

10. The server of claim 9, wherein the processor is operative to allow the verification vote of the co-authorizing participants to accept the planned changes or to revert the planned changes for the configuration item.

11. The server of claim 1, wherein the inside domain is different from the interested outside domains;
    wherein the configuration item is managed by the inside domain and other configuration items are managed by the interested outside domains; and
    wherein the other configuration items managed by the interested outside domains are dependent upon the configuration item of the inside domain.

12. A method for implementing change management across domains on a computer, the domains being owned and managed by different entities, comprising;
    announcing, by a computer, planned changes for one or more configuration items to interested outside domains, the configuration items being in an inside domain;
    providing, by the computer, open subscription to the interested outside domains such that the interested outside domains can subscribe to the subscription as participants;
    creating, by the computer, a change instance for the configuration items in the inside domain;
    reporting, by the computer, change progress of the change instance for the configuration items to the participants of the interested outside domains;
    distributing, by the computer, state progress notifications to the participants of the change;
    executing, by the computer, the change instance to make planned changes to configuration items;
    causing another computer in the interested outside domains to receive notifications of the planned changes for the configuration items; and
    enabling the other computer to join a subscription in a change coordination for the configuration items.

13. The method of claim 12, maintaining a table of externalized configuration items that can be accessed by the interested outside domains.

14. The method of claim 12, further comprising classifying the participants of the interested outside domains for the planned changes as at least one of:
    informative participants being enabled to follow a change process of the planned changes without influencing the panned changes;
    consultative participants being enabled to provide feedback about the change process;
    co-authorizing participants being enabled to influence the change process through the co-authorizing participants' authorization vote; and
    co-verifying participants being enabled to influence the change process through the co-authorizing participants' verification vote during verification phase.

15. The method of claim 14, wherein in response to receiving the authorization vote, the authorization vote of the co-authorizing participants is allowed to reject the planned changes or accept the planned changes during an authorization phase.

16. The method of claim 14, wherein in response to receiving the verification vote, the verification vote of the co-authorizing participants is allowed to accept the planned changes or revert the planned changes for the configuration items.

17. A computer program product, embodied on a non-transitory computer readable storage medium, the computer program product including instructions for causing a computer to execute a method for implementing change management across domains being owned and managed by different entities, comprising:
    announcing planned changes for one or more configuration items to interested outside domains, the configuration items being in an inside domain;
    providing open subscription to the interested outside domains such that the interested outside domains can subscribe to the subscription as participants;
    creating a change instance for the configuration items in the inside domain;
    reporting change progress of the change instance for the configuration items to the participants of the interested outside domains;
    distributing state progress notifications to the participants of the change;
    executing the change instance to make planned changes to configuration items;
    causing a computer in the interested outside domains to receive notifications of the planned changes for the configuration items; and
    enabling the computer to join a subscription in a change coordination for the configuration items.

* * * * *